United States Patent Office 2,701,846
Patented Feb. 8, 1955

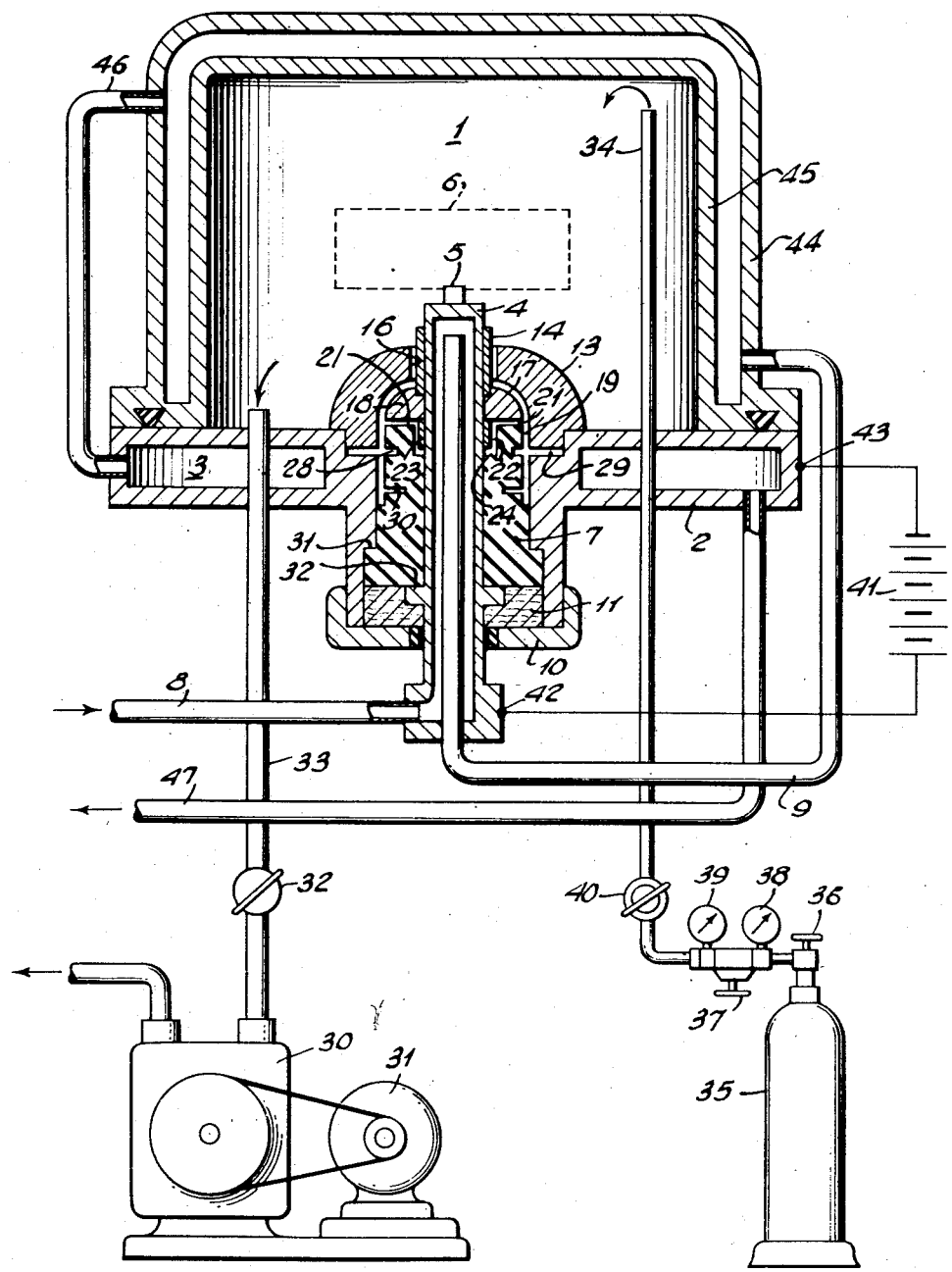

2,701,846

LEAD-IN DEVICE FOR HIGH-POWER CURRENTS

Bernhard Berghaus, Lachen, and Hans Bucek, Zurich, Switzerland; said Bucek assignor to said Berghaus Application January 18, 1951, Serial No. 206,672

15 Claims. (Cl. 313—19)

It is well known from present day scientific knowledge that glow discharges occur at pressures from a hundredth of a millimetre mercury column ( 0.01 mm. Hg). At low pressures between 0.1 and 5 mm. Hg the passage of electricity through the gas takes place as a glow discharge in the usual manner. In the pressure region from 5 to 20 mm. Hg, these glow discharges may, under certain circumstances, be still maintained but they are already unstable and may finally pass over into the normal spark or arc discharge, when the pressure is further increased, depending on the power of the supplying source of current (see Loeb, Fundamental Processes of Electrical Discharge in Gases, New York, John Wiley and Sons, Inc. 1947).

Disregarding the use of gaseous discharges for illuminating purposes, the technical application of same is found in the field of metal sputtering, heating in low-pressure glow discharges, carrying out chemical reactions in dark corona discharges under atmospheric pressure, for example for the production of ozone, or in the form of scintillating discharges of a few tenths of an atmosphere as used for example in the synthesis of hydrocarbons. Further, the electric arc is used, in an atmosphere consisting of air, for the production of nitrogen or, in different atmospheres, for producing other substances, for example, for manufacturing acetylene in a hydrogen atmosphere. In these cases, either pure temperature effects are created or the substances are influenced chemically or electrically.

According to the above-cited literature, glow discharges of high intensity at gas pressures up to 40 mm. Hg have already been applied for the surface improving of materials, particularly metals or for other treatment. It may be assumed that a really certain control of such processes, such as is necessary for any technical application is only possible at pressures up to not more than 10 mm. Hg, whilst the region between 10 and 40 mm. Hg has been ruled out as being of no practical application. The production of stable glow discharges at these pressures is indeed very difficult, especially as intense local heating and chemical attacks occur, due to ion bombardment and as the consequence of electron streams. The glowing tract produced by the discharges severely narrows itself down with increasing pressure, so that large quantities of energy are released over a small space, with the result that the above-mentioned local heating effects and chemical actions arise. The consequence is that the lead-in devices, and particularly their insulation, are extensively destroyed by these discharges in a relatively short time. These facts must be taken into account particularly in the case of high-intensity discharges such as are met with in the technical field, for example for treating materials, chemical synthesis and disintegration processes. It must also be taken into account that these conversion processes release considerable quantities of metallic vapor and sputtered particles which lead to depositions on the electrodes and even to bridge formations, so that flashovers with their destructive accompanying effects occur.

According to the conception already put forth and confirmed by the most-up-to-date literature (Loeb and others), there is however no possibility of exploiting economically the low pressures under consideration. Generally the notion has been held, and will continue to be held, that apart from the above-mentioned low pressures of 40 mm. Hg, quoted in the cited literature, technically applicable glow discharges are only attainable at pressures of 5 mm. Hg and still lower, if there is not to be the risk of the glow discharge passing over into other discharge forms, particularly sleeve discharges and scintillating discharges. These forms have the fundamental effect, which precludes their practical utility, namely that their expanse is superficially very limited and in fact is generally confined to a spot. This incurs intense local heating and over-heating and to an energy distribution restricted exclusively to the discharge path between anode and cathode. Hence it is not possible for work-pieces to be treated over their entire surface once they have been given their shape. Moreover, the desired transfer of a maximum proportion of the available electrical energy to the work-piece under treatment does not take place.

In contrast to the above, glow discharges within the meaning of the present invention imply gaseous discharges which increase the typical external form of the discharge even at pressures above the region from 5 to 40 mm. Hg. possibly up to atmospheric pressure and beyond. Thus the energies supplied may amount to many times the values usual in the well known applications, say for lighting purposes, i. e. several or even many kilowatts.

One of the main problems consists in passing these large electrical powers through the walls bounding such treating or reaction chambers, in short: discharge spaces, especially as these discharge spaces are regularly under pressure conditions differing considerably from atmospheric pressure, especially intensive vacuum pressures and overpressures. In operation, there arise throughout intense local heating effects in combination with a particularly severe chemical activity, so that the lead-in devices and the insulators used for same become damaged and finally destroyed. These destructive effects take place so rapidly and extensively that they absolutely preclude a satisfactory practical operation.

These deleterious effects have now been successfully avoided by providing shields for the current leads in the form of gaps or interstices in the lead-in members. These interstices which have already been given a curved, stepped or other shaped course have the effect of repelling the penetration of the glow forming in the main during such discharges so that it can no longer result in the above mentioned local heating actions and the development of chemical activities thereby made possible. It has been found however that relatively quickly a limit is reached between the practicability of these very finely proportioned gaps or interstices and the thickness of the glow. Certain substances of value for processes and reactions, particularly gases, have the property that they result in very tenuous glow. The result is that notwithstanding the narrow gaps, which are still technically producible with the usual tools and machine tools, this glow creeps over to the insulator surfaces and other involved surfaces at electrical potential or without same, and re-commence their destructive action. These gases include particularly nitrogen, which is of decisive importance as a treating material, because it is used for nitriding the surfaces of objects with a view to refining or improving them. Thus when using these processing and reaction substances, there is a need to be able to control the conditions completely. So far this has not been possible.

The present invention is based on the surprising discovery, that flash-overs are attributable to the fact, that the course of these gaps or interstices has usually been continuous in all cases. These flash-overs are also encouraged by the fact, that the conversion of large energies in the discharges gives rise to considerable quantities of metallic vapor and sputtered particles. This may lead to dust precipitations and bridge formations in the interstices. This continuous course of the gaps is responsible for the development of certain electrical conditions which, even if they are not the direct cause, at least promote the deleterious effects. If the development of these conditions is arbitrarily arrested—and this is a further disclosure according to the invention—by a discontinuity, it is found, that even exceedingly tenuous glowing tracts do not follow this discontinuity, so that the insulation of the lead-in device is no longer attacked.

Proceeding from these disclosures, according to the invention, the lead-in devices of an electric conductor, which pass through the bounding walls of discharge spaces and which are screened against discharge effects by means of gap-like interstices, are characterised by the fact, that at least one interstice comprises a discontinuity.

These discontinuities may be realised in a diversity of ways. As in any case it is necessary to resort to cooling, there is first of all the possibility of chilling individual gap-forming structural parts or certain portions thereof very severely or of keeping them cold with cooling brines, so as to break up the continuity in this way. A particularly advantageous means is the discontinuous shaping or delimiting of the gap-like interstices, where it is extremely simple, to make alterations in cross-section. If the alterations of cross-section are arranged as cavities in structural components or portions thereof bounding the interstices, these cavities constitute as it were continuations or branches of generally transverse gaps. The differing proportions of the width and depth of these transverse gaps provides a means whereby the extent of the discontinuity can be varied in a diversity of ways to suit the particular requirements. It is advantageous to shape these cavities as annular slots. These annular slots may be formed as plane surfaces, but are not necessarily limited to this. Again this plane may lie transverse to the longitudinal direction of the electric conductor, preferably at right angles to it. There is however also the possibility of a parallel configuration, particularly at the end of the transverse gap, so that a further branching is ensured.

Similarly there are any number of possibilities of arranging the cavities. They may be provided in the body of the insulator, in the walls of the discharge space or even in the anode. There is also the possibility of placing them in the cathode. However, owing to the possibility of hollow cathode discharges with the release of considerable energies arising, care must be taken to adhere to or to avoid certain dimensions, depending on the kind of gas used and pressure of the gas. Naturally there is no limitation to the cavities being provided in one of these parts only. It is in fact possible to provide the cavities in the body of the insulator and in the cathode, in the anode and cathode and finally in the anode, cathode and insulator body. The same also applies to the walls of the discharge space, which receives the lead-in device. This does not mean that a plurality of cavities is necessary in every case. It has in fact been found, that a single properly arranged and dimensioned cavity is sufficient, but in certain special cases the above deviations may be resorted to. It is not imperative to provide the cavities solely within these structural parts of the lead-in device. The cavity may also be provided at bounding faces between anode and cathode, between anode and the insulator body, between cathode and insulator body; moreover, as the bounding faces between anode and cathode on the one hand, and anode and insulator body on the other hand; cathode and insulator on the one hand, and anode on the other hand; and finally, at bounding faces of all three parts or at the common bounding faces of the latter. The same also applies to the discharge space walls.

In the spirit of the invention it is essential that once the arrangement and dimensioning has been precisely arrived at care must be taken to see that these pre-adjusted conditions are not altered during or as a result of the working operations. Amongst such alterations are chiefly displacements caused by thermal expansion. To accommodate the cavities, structural parts or portions thereof are not exposed to any appreciable extent to expansion charges. If such structural parts or portions thereof are not available or usable, they will be so shaped that the changes caused by thermal expansion have practically no influence on the configuration or bounding faces or on the position of the cavities. This may be achieved in the simplest way by the gap-forming structural parts and portions thereof being arranged as fixed points so that, proceeding from these fixed points, the expansions are given a degree of freedom leading away from the fixed points. The same can also be attained by suitable cooling arrangements and by the choice of certain cooling medium temperatures. In the same way heat insulating materials, heat-insulating gaps and other well known means from the appropriate technical art are also applicable. There also exists the possibility of realising the relative movements in such a way that the thermal expansions of structural parts or portions thereof compensate each other in the vicinity of the slot-like cavities, or arranging that they are of equal magnitude and run in the same direction, so that the position, shaping or delimitation of the cavity remains substantially the same.

The drawing shows an embodiment of the invention in the example of a lead-in device for a vacuum vessel such as used for treating work-pieces or for carrying out chemical reactions by means of high-intensity gaseous discharges.

It shows a gaseous discharge chamber which by means of its base, side walls and cover encloses in space 1 into which the lead-in device is to be introduced. In the present case there is a double-walled base 2 so as to form a cooling space 3 which contains or is traversed by a coolant. If the vessel wall 2 is anodically connected, the cathode 4, with extension 5 for the attachment of the parts 6 under treatment, is led through the insulator 7. The cathode 4 is cooled. The coolant entrance is at 8, the exit at 9, so that the cooling of the cathode over its entire longitudinal expanse is ensured. A screw cap 10 presses the packing 11 against the insulator 7. Rubber, plastic or all other suitable insulating substances may serve as packing material.

Whereas, as previously stated, the arrangement of passages 16, 17, 19 was hitherto absolutely continuous which was arranged by providing a gap of constant width, according to the invention discontinuities are established by providing special cavities in the form of further annular gaps which are located partly in the anode, partly in the cathode, partly in the vessel wall and partly at the bounding faces between these structural parts.

First of all, the annular gap 21 will be recognized between the cathode ring 18 and the upper end face of the insulator 7. This annular gap passes into a cylindrical gap portion 22 which is likewise situated at a bounding face between insulator 7 and the annular piece 23 of the cathode. Finally, adjoining the cylindrical gap 22, is an annular slot 24, which is carried through up to the outer casing 25 of the cooling system of the cathode. For the purpose of forming the gaps 22 and 24, the insulator 7 need only be provided with a dish-shaped cavity.

A second discontinuity is realised by arranging an annular slot 28 in the insulator 7 and a further annular slot 29 between the anode cap 13 and the vessel wall 2. The slots 28 and 29 lie opposite each other so that they form a very considerable deviation from the annular cylindrical gap 19. A further point of unsteadiness is provided in the insulator 7 itself by the annular slot at 30.

As will be seen, the fixed point of the insulator 7 lies at the seating or at the shoulder 31 of the vessel wall, so that the heat expansions of the insulator 7 take place in upwards direction from below. In order to prevent the width of the transverse gap 21 from altering, the cathode is secured in the vicinity of the shoulder 31 namely at 32. By suitable choice of materials and taking into account the operational conditions caused by the cooling process and the coolant temperatures, care can be taken to see that the portions of the structural parts 7 and 18 or 22 bounding the gap 21 expand in the same direction when higher temperatures arise, so that the width of the gap 21 remains unaltered. The same also applies to the other transverse gaps. Conversely there is also the possibility—not illustrated in the drawing—of providing the fixing points in the vicinity of the gap 21. In this case the thermal expansions extend in both directions from the selected fixed point in such a way that less regard need be paid to particular materials or to equal expansion movements.

The invention is in no way limited to the illustrated example of a type of discontinuities caused by changes in cross-section of the screening gaps. Their configuration can be varied in a diversity of ways. Thus for example it is not necessary to make the portions 16, 17 and 19 of the gap contiguous. The gap may be composed of separate parts by interposing say between the gap portions the cavity of the discharge vessel itself to act as a point of interruption and therefore of unsteadiness. This modified embodiment has the advantage of being applicable in the case of thin glow, which is produced according to the particular electrical conditions, kind of gas and pressure.

The drawing also illustrates certain additional devices. In the first place there is an evacuating pump 30 driven by the electric motor 31. A shut-off device 32 makes it possible to seal off the interior of the discharge chamber from the evacuation pump completely. The evacuation pump itself is connected to the discharge vessel 1 through the conduit 33. There is also provided a supply pipe 34 for any treating gases which are stored in the cylinder 35 or in a gas-holder or the like. The cylinder 35 is provided in the usual manner with a shut-off device 36, a pressure-reducing valve 37, pressure-indicating devices 38, 39 in front of and behind the pressure-reducing valve, as well as a shut-off device 40. The source of current 41 is connected to the cathode 4 at 42, whilst the anode 2 is connected to the source of current 41 at 43. The coolant led off from the cathode over the tube 9 also serves to cool the cup-shaped casing 44 of the gaseous discharge space 1. The cap 44 is made double-walled to form a cooling space 45 which is in communication with the tube 9. The coolant is drawn off at 46 and, after flowing through the cooling space 3, is led away at 47.

The invention described herein relates to the same general type of apparatus as is disclosed in our copending applications, Serial Nos. 206,673, 206,674, and 206,675, all filed January 18, 1951. The inventions described in such copending applications are however distinguished from that described and claimed herein in that, whereas the invention of the present application is directed to the structure and relationship of the electrodes of a glow discharge device whereby a discontinuous gap is provided between the several parts, the invention described and claimed in application Ser. No. 206,673 relates to the detachability of certain parts of the electrode structure. Application Ser. No. 206,674, on the other hand, relates to a process and apparatus for the treatment of articles by an electric glow discharge wherein the intensity of the glow discharge is periodically altered in various ways; while application Ser. No. 206,675 relates to a process and apparatus for diminishing the effects of high-frequency oscillations in the glow discharge space.

We claim:

1. In a glow discharge device including a closed chamber having electrodes adapted to be connected with a source of electric potential, the combination with said electrodes, of an insulator disposed between the electrodes in such manner that a gap is provided therebetween which opens into the interior of the chamber, said gap extending from the region of contact of the insulator with an electrode and, viewed from the interior of the chamber, being disposed in front of the insulator, the length of the gap between the said region of contact and the mouth of the gap in the interior of the chamber being large in comparison with its width, and said gap having a discontinuity at least at one point along its length in the form of a considerable increase in the width thereof for a limited portion of its length.

2. A device according to claim 1, wherein the said portion of the length of the gap is approximately equal to the width of the gap.

3. In a glow discharge device including a closed chamber, the combination of two concentrically arranged electrodes of different potentials, an insulator disposed between the electrodes, the parts being so shaped that there is provided a gap which is very narrow in relation to its length and which, viewed from the interior of the chamber, extends in front of the insulator and reaches to the insulator, said gap being bounded, at least for a portion of its length, by the surface of an electrode, the gap at a region between the insulator and the interior of the chamber being widened along its length for a portion thereof, such region being of the same order of magnitude as the width of the gap.

4. A device according to claim 3, wherein the gap is of annular form, and wherein the annular widening of the gap is produced by a groove in the surface of one of the two electrodes.

5. A device according to claim 3, wherein the gap is of annular form, the annular widening of the gap being bounded on the one hand by an electrode and on the other by an insulator.

6. A device according to claim 5, wherein the annular widening of the gap is formed by a groove in the surface of the last-named insulator.

7. In a glow discharge device including a closed chamber having electrodes adapted to be connected with a source of electric potential, the combination with said electrodes of an insulator disposed between the two electrodes, the parts being so shaped that there is formed a gap which, viewed from the interior of the chamber, is disposed in front of the insulator and opens into the interior of the chamber, the length of the gap between the region of contact of the insulator with an electrode and the opening into the device being large in comparison with the width of the gap, said gap being disposed in part between the surface of an insulator and the surface of an electrode, and being considerably widened at least at one region along its length and intermediate its end, such region being of a length of the order of magnitude of the gap width.

8. A device according to claim 3, wherein the aforementioned electrode is cooled.

9. In a glow discharge device including a closed chamber having electrodes adapted to be connected with a source of electric potential, the combination with the two electrodes, of an insulator disposed between the electrodes in such manner that a gap is provided between the insulator and one of the electrodes, said electrodes having portions overlying but in spaced relation to the end of the insulator facing the interior of the chamber so as to form a gap which communicates with the first gap.

10. A device according to claim 9, wherein the said portions of the electrodes are in overhanging spaced relation with reference to each other.

11. A device according to claim 9, wherein the electrodes are arranged concentrically, the first gap being of cylindrical form and being disposed between the insulator and the outer electrode, there being at least one transverse annular gap communicating with the first-mentioned gap.

12. A device according to claim 9, wherein the transverse gap is disposed between the inner electrode and the insulator.

13. A device according to claim 9, wherein the electrodes are arranged concentrically, the gap being of cylindrical form and being disposed between the insulator and the outer electrode, there being at least one transverse annular gap communicating with the first-mentioned gap, said transverse gap being disposed within the insulator.

14. A device according to claim 9, wherein the electrodes are arranged concentrically, the gap being of cylindrical form and being disposed between the insulator and the outer electrode, there being at least one transverse annular gap communicating with the first-mentioned gap, said transverse gap being disposed between the inner and outer electrodes.

15. A device according to claim 9, wherein the electrodes are arranged concentrically, the gap being of cylindrical form and being disposed between the insulator and the outer electrode, there being at least one transverse annular gap communicating with the first-mentioned gap, said transverse gap being disposed within the outer electrode.

References Cited in the file of this patent

UNITED STATES PATENTS

| Number | Name | Date |
|---|---|---|
| 1,905,993 | Buff | Apr. 25, 1933 |
| 2,031,214 | Fisher | Feb. 18, 1936 |
| 2,219,611 | Berghaus et al. | Oct. 29, 1940 |
| 2,219,613 | Berghaus et al. | Oct. 29, 1940 |
| 2,219,614 | Berghaus et al. | Oct. 29, 1940 |
| 2,319,615 | Berghaus et al. | Oct. 29, 1940 |
| 2,257,411 | Berghaus et al. | Sept. 30, 1941 |
| 2,454,757 | Smith | Nov. 23, 1948 |
| 2,468,175 | Cotton | Apr. 26, 1949 |